Dec. 11, 1928.
R. J. WINSOR
STEERING DEVICE
Filed Dec. 26, 1925
1,695,219
2 Sheets-Sheet 2
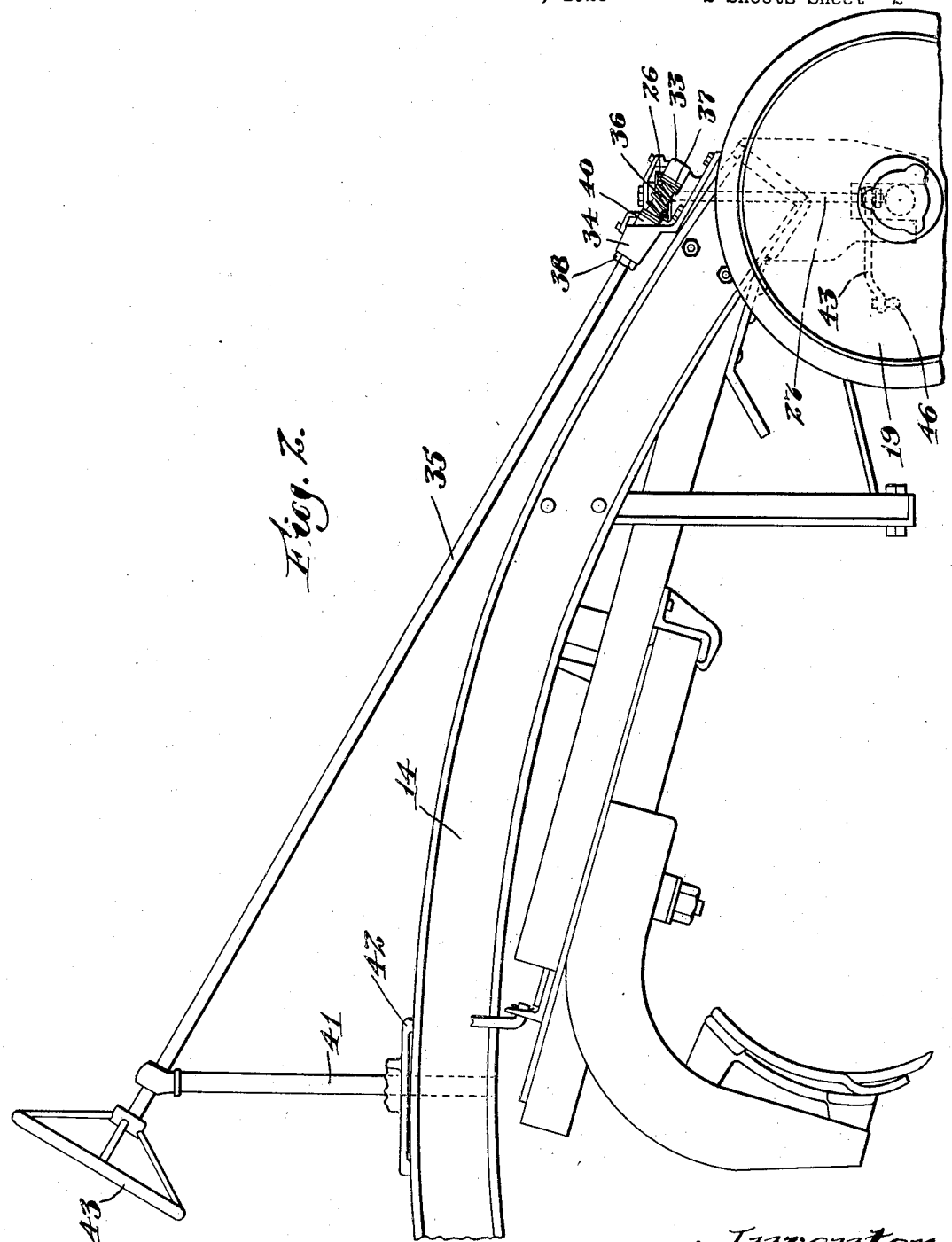

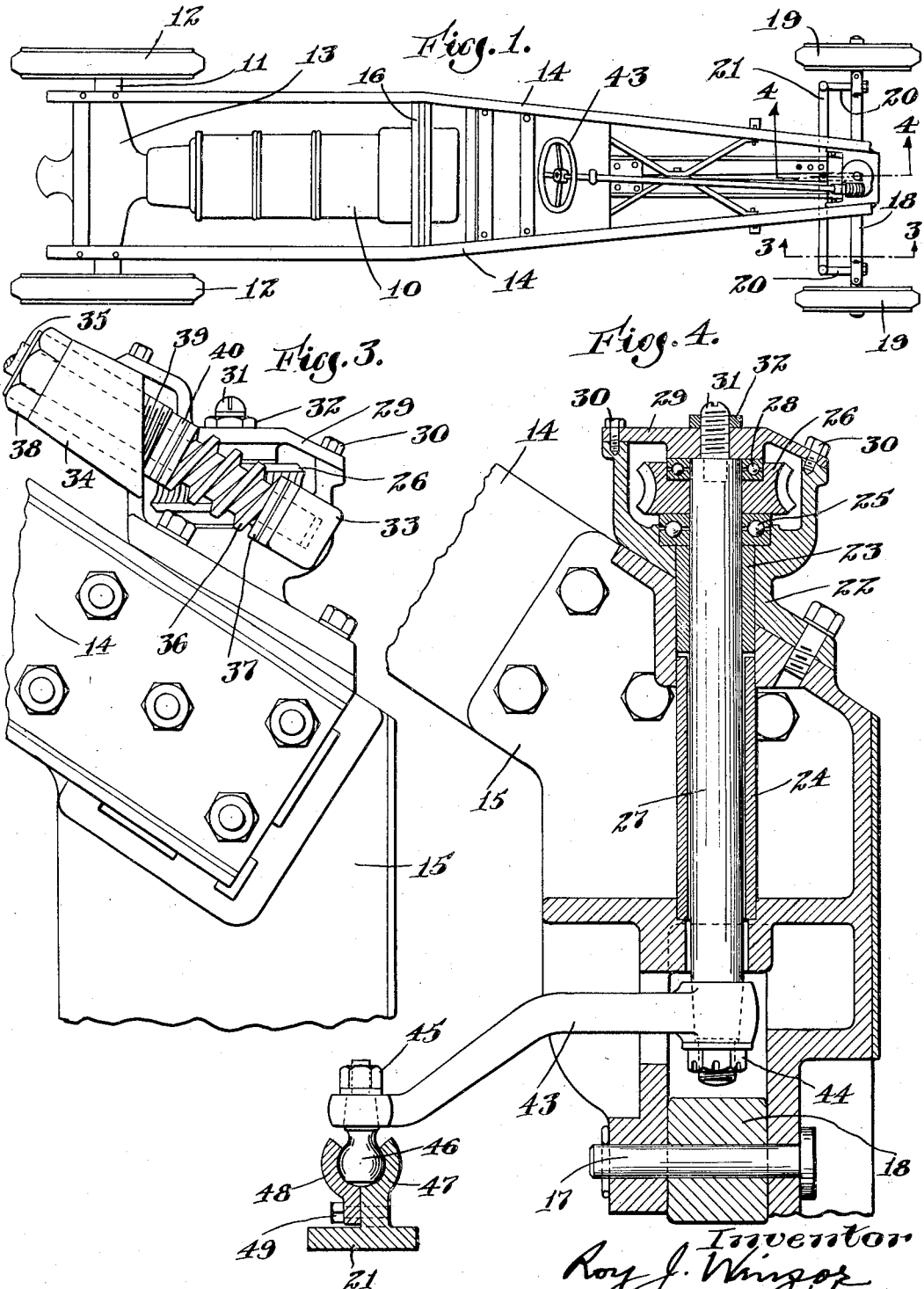

Patented Dec. 11, 1928.

1,695,219

UNITED STATES PATENT OFFICE.

ROY J. WINSOR, OF BUCYRUS, OHIO.

STEERING DEVICE.

Application filed December 26, 1925. Serial No. 77,849.

My present invention relates to steering devices, and more particularly to an improved steering device for automotive vehicles.

In automotive vehicles, such for example, as automobiles, the steering gear associated with the front axles is held in very close relation to the vehicle frame, practically the only action of the axle and therefore the steering device in relation to the frame being the deflecting of the springs. This does not allow more than one or two inches of disalignment between the axle and the frame. This construction allows the use of a very long drag link for the steering gear. In the development of grading or other road-working machinery where it was attempted to use the ordinary steering device, the steering gear is placed under a very heavy strain and the steering gear arms or the steering gear itself, was continually broken. This was due to the fact that in the type of axle used in the road grader or other road-working machinery, ordinarily pivoted in the center, on uneven ground it gave a motion upwardly and downwardly of from fourteen to sixteen inches of travel and in some cases this travel was as high as twenty inches. Under these circumstances where a long drag link was employed, the drag link would not stand up and the work or strain periodically broke or wrecked the steering gear itself.

With a view to remedying defects of the prior structures of this character, I have devised the subject matter of the present invention and have utilized a steering device which is in vertical alignment with the horizontal pivot shaft of the front axle. With this construction, the drag link may be long or short, as desired, and the connection thereof to the connecting bar between the steering arms is in alignment with the shaft of the axle. With this arrangement of parts, no strain whatever is placed on the drag link or the steering device due to mere unevenness of the ground or to the oscillation of the axle.

The principal object of my invention, therefore, is an improved steering device.

Another object of my invention is an improved steering device for automotive vehicles utilizing a centrally pivoted front axle.

Other objects and novel features of the construction and arrangement of parts comprising the device will appear as the description of the invention progresses.

In the accompanying drawings illustrating the preferred embodiment of my invention, Fig. 1 is a plan view of the road grading machine to which my invention has been applied.

Fig. 2 is an enlarged side elevation of the forward portion of Fig. 1.

Fig. 3 is a fragmentary side elevation on the line 3—3 of Fig. 1 on an enlarged scale, and Fig. 4 is a sectional elevation on the line 4—4 of Fig. 1 on an enlarged scale.

Referring to the drawings, 10 designates a power plant of a structure provided with a rear axle housing 13 in which is a rear axle 11, having secured at either end the rear drive wheels 12. Secured to the rear axle housing on either side of the power plant 10 are arched frame members 14 that extend forwardly to any desired distance and are secured to a head casting 15. Intermediate the ends of the side frame members 14 is secured a cross brace 16 that supports the front end of the power plant 10. At the lower end of the head casting 15, and extending transversely therethru, is a king pin 17 on which is rotatably mounted at its middle point a front axle 18. At each end of the front axle are arranged the usual knuckle joints on which are rotatably mounted front wheels 19. Secured to the knuckle joints and extending rearwardly therefrom are steering arms 20, the ends of which are pivotally attached at either end of a connecting bar 21.

Secured to the top sloping face of the head casting 15 is a support 22, this support being provided with a vertically arranged tubular member 23 that extends downwardly and into the head casting 15. In alignment with the tubular member 23 and secured to the head casting 15 is a tubular member 24. In the member 22 above the tubular member 23 is a ballbearing 25. The upper portion of the ballbearing 25 is secured to a worm wheel 26, this worm wheel having secured thereto and extending downwardly therefrom, a vertically arranged shaft 27, this shaft 27 being a rotating fit into the tubular member 23. Secured in the upper face of the worm wheel 26 is a ballbearing 28, the upper portion of such ballbearing engaging with the lower face of a cover plate 29, this cover plate being secured to the open upper end of the member 22 by bolts 30. The cover plate 29 in alignment with the shaft 27 is drilled and tapped to receive a threaded bearing bolt 31, a check nut 32 being associated therewith to hold the same in adjusted position. The inner or lower end of this adjusting screw 31 engages with the recess in the upper end of the vertical shaft 27, as clearly indicated by the dotted lines in Fig. 4. Secured to or formed integral with the member 22 are spaced bearings 33 and 34 respectively. The bearing 33 is drilled to receive the reduced end of the steering shaft 35 and on such shaft 35 is secured or formed integral therewith a worm 36. Between the lower end of the worm 36 and the bearing 33 is placed a roller bearing 37.

Secured to the bearing member 34 by nut 38 is a threaded bearing sleeve 39 and between the lower end of the bearing sleeve 39 and the worm 36 is placed a roller bearing 40. By means of the threaded sleeve 39 and nut 38, the end plate of the worm 36 may be adjusted.

The steering shaft 35 extends upwardly and rearwardly, as clearly shown in Fig. 2, and is supported adjacent to its upper end in a bearing standard 41, secured to a cross plate 42 extending between the frame members 14. Secured to the upper and rearward end of the steering shaft 35 is a steering wheel 43. The lower end of the vertical shaft 27 is tapered and threaded, as clearly shown in Fig. 4, and on the tapered portion fits one end of a drag link 43. The drag link 43 is held onto such tapered portion by a nut 44. To the free end of the drag link 43 is secured by nut 45 a bolt 46, which bolt fits into a ball socket on the central portion of the connecting plate 21, this ball socket comprising the members 47 and 48 held together in adjusted position by means of a bolt 49.

The automotive vehicle illustrated in the drawing is assumed to be a road-working machine and it is, therefore, necessary that it be capable of working on a non-level place. Under such conditions there is a considerable pivotal movement of the front axle about the king pin 17 thereof. With the ordinary construction the drag link 43 under such conditions would be subjected to heavy strains and the drag link, as well as the connecting plates 21, and knuckle arms 20, would be very apt to break. By having, however, the ball sockets comprised of the members 47, 48 and 49 in the central portion of the connecting bar 21 and by having the bolt 46 associated with such sockets in vertical alignment with the king pin 17 of the front axle, there is no strain whatever placed on the drag link 43 regardless of the amount of rotation or deflection of the front axle 18 on its king pin 17.

By my invention, therefore, I am able to construct an improved device in which the danger of the steering device breaking, because of strains set up therein, is positively eliminated.

While I have necessarily shown the improved embodiment somewhat in detail, it is to be understood that I may vary the size, shape, and arrangement of parts comprising the device within wide limits without departing from the spirit of the invention.

Having thus described my invention, what I claim as new is:

1. An improved steering device for automotive vehicles comprising a front axle, a horizontal pivotal mounting therefor, steering wheels at either end thereof, a connecting bar extending between such steering wheels and a drag link pivotally connected at one end to the connecting bar in alignment with the horizontal axis of the front axle, and pivotally mounted at its other end in vertical alinement with and directly above the horizontal axis of the front axle.

2. An improved steering device for automotive vehicles comprising a front axle, means for pivotally mounting same at its central point on a horizontal axis, steering wheels rotatably mounted at either end of said axle, connections between the steering wheels for moving the same in unison and in the same direction, a drag link pivotally mounted on said connecting means in alignment with the horizontal axis of the front axle, supporting means for said drag link comprising a rotatably mounted shaft arranged above the horizontal axis of the front axle and means for rotating said supporting means at will.

In testimony whereof, I have signed my name to this specification.

ROY J. WINSOR.